(12) United States Patent
Glück et al.

(10) Patent No.: US 6,444,714 B1
(45) Date of Patent: Sep. 3, 2002

(54) METHOD FOR PRODUCING EXPANDABLE POLYSTYRENE PARTICLES

(75) Inventors: Guiscard Glück, Mainz; Franz-Josef Dietzen, Ludwigshafen; Klaus Hahn, Kirchheim; Gerd Ehrmann, Deidesheim, all of (DE)

(73) Assignee: BASF Aktiengesellshaft, Ludwigshafen (DE)

( * ) Notice: Subject to any disclaimer, the term of this patent is extended or adjusted under 35 U.S.C. 154(b) by 0 days.

(21) Appl. No.: 09/856,487

(22) PCT Filed: Dec. 7, 1999

(86) PCT No.: PCT/EP99/09553

§ 371 (c)(1),
(2), (4) Date: Jun. 11, 2001

(87) PCT Pub. No.: WO00/34342

PCT Pub. Date: Jun. 15, 2000

(30) Foreign Application Priority Data

Dec. 9, 1998 (DE) .......................................... 198 56 758

(51) Int. Cl.⁷ ................................ C08J 9/20; C08J 9/22

(52) U.S. Cl. .............................. 521/56; 521/57; 521/60; 521/82; 521/92; 521/93

(58) Field of Search ............................... 521/56, 92, 57, 521/60, 93, 82

(56) References Cited

U.S. PATENT DOCUMENTS 3,574,644 A * 4/1971 Olstowski et al. ............. 106/15
5,719,199 A * 2/1998 Wallace et al. ................ 521/82

FOREIGN PATENT DOCUMENTS

DE  198 43 327   3/2000
EP  0 729 999    9/1996

* cited by examiner

Primary Examiner—Morton Foelak
(74) Attorney, Agent, or Firm—Oblon, Spivak, McClelland, Maier & Neustadt, P.C.

(57) ABSTRACT

A process for preparing expandable particulate styrene polymers wherein from 5 to 50% by weight of expanded graphite and also, if desired, from 2 to 20% by weight of a phosphorus compound, are present as flame retardants, by suspension polymerization of styrene in the presence of the flame retardants.

14 Claims, No Drawings

METHOD FOR PRODUCING EXPANDABLE POLYSTYRENE PARTICLES

BACKGROUND OF THE INVENTION

The invention relates to expandable particulate styrene polymers which have been provided with halogen-free flame retardants.

DISCUSSION OF THE BACKGROUND

Molded polystyrene foams are widely used to insulate buildings and components of buildings. For this application they must be flame-retardant. The flame retardants usually used for rendering polystyrene foams flame retardant comprise halogens. For environmental reasons the use of halogens in foams should be reduced.

SUMMARY OF THE INVENTION

It is an object of the present invention to provide expandable polystyrene particles which can be processed to give foams which achieve fire classifications B 1 and B 2 and which have been produced without the use of halogen-containing flame retardants.

We have found that this object is achieved by a process for preparing particulate expandable styrene polymers by polymerizing styrene, where appropriate together with comonomers, in aqueous suspension with use of blowing agents prior to, during, or after the polymerization, where the polymerization is carried out in the presence of from 5 to 50% by weight, based on the monomers, of expanded graphite.

The invention also provides particulate, expandable styrene polymers which comprise from 5 to 50% by weight, based on the styrene polymer, of uniformly distributed expanded graphite with an average particle size of from 20 to 100 μm, preferably from 30 to 80 μm Expanded graphite is described in the literature in combination with red phosphorus and/or with phosphorus-containing compounds as a flame retardant for compact polystyrene. However, it has been found in previous experiments that halogen-free flame retardants which can be used for compact polystyrene cannot be used in foam production, since there is either a severe adverse effect on the foaming process or an excessive reduction in the heat resistance of the foam. Surprisingly, however, this is not the case in the present invention.

U.S. Pat. No. 3,574,644 describes the addition of expanded graphite as flame retardant for combustible materials, inter alia for foams in which the amounts of expanded graphite present are to be from 20 to 40% by weight. The expanded graphite may either be incorporated into the expandable material prior to expansion or coated on to this material after the expansion process. The preparation of expandable polystyrene particles by polymerizing styrene in the presence of expanded graphite is not described.

JP-A 03-167 236 describes a polystyrene foam which comprises, as flame retardant, expanded graphite whose surface was entirely coated with a film-forming resin. This coating is indicated as being necessary to prevent corrosion of processing machinery by acids always present in the expanded graphite. However, it requires an additional and complicated operation. Besides the expanded graphite, the polystyrene foam may also comprise conventional flame retardants, e.g. halogenated organic phosphates. The polystyrene foam is preferably prepared by mixing polystyrene foam particles with an adhesion promoter and with the coated expanded graphite. The particle size of the expanded graphite is preferably to be from 30 to 120 mesh, corresponding to a diameter of from about 120 to 540 μm. At particle sizes below 150 mesh (104 μm) it is said that the flame-retardant action of the expanded graphite is markedly reduced.

DETAILED DESCRIPTION OF THE INVENTION

The layered lattice structure of graphite enables it to form specific types of intercalation compounds. In these compounds, which are known as interstitial compounds, foreign atoms or foreign molecules have been absorbed into the spaces between the carbon atoms, sometimes in stoichiometric ratios. These graphite compounds, e.g. with sulfuric acid as the foreign molecule, are also prepared on an industrial scale and are termed expanded graphite. The density of this expanded graphite is from 1.5 to 2.1 $g/cm^3$, and its average particle size is generally from 20 to 2000 μm, in the present case preferably from 20 to 100 μm, and in particular from 30 to 80 μm.

Phosphorus compounds which may be used are inorganic or organic phosphates, phosphites or phosphonates, and also red phosphorus. Examples of preferred phosphorus compounds are diphenyl phosphate, triphenyl phosphate, diphenyl cresyl phosphate, ammonium polyphosphate, resorcinol diphenyl phosphate, melamine phosphate, dimethyl phenylphosphonate, and dimethyl methylphosphonate.

In the suspension polymerization of the invention, it is preferable to use only styrene as monomer. However, up to 20% of the weight of styrene may have been replaced by other ethylenically unsaturated monomers, such as alkylstyrenes, divinylbenzene, acrylonitrile, diphenyl ether, or α-methylstyrene.

During the suspension polymerization, use may be made of the usual auxiliaries, e.g. peroxide initiators, suspension stabilizers, blowing agents, chain transfer agents, expansion auxiliaries, nucleating agents, and plasticizers. The expanded graphite is added during the polymerization in amounts of from 5 to 50% by weight, preferably from 8 to 30% by weight, and the phosphorus compound in amounts of from 2 to 20% by weight, preferably from 3 to 10% by weight. Blowing agents are added in amounts of from 3 to 10% by weight, based on monomer. They may be added prior to, during, or after the polymerization of the suspension. Suitable blowing agents are aliphatic hydrocarbons having from 4 to 6 carbon atoms. It is advantageous for inorganic Pickering dispersants to be used as suspension stabilizers, e.g. magnesium pyrophosphate or calcium phosphate. It has been found that when expanded graphite of relatively low particle size is used, i.e. expanded graphite with an average diameter of from 20 to 100 μm, preferably from 30 to 80 μm, the stability of the suspension is better than when using coarser expanded graphite particles, and the particles produced have lower internal water content.

The suspension polymerization produces bead-shaped, essentially round particles with an average diameter in the range from 0.2 to 2 mm. They may be coated with the usual coating agents, e.g. metal stearates, glycerol esters, or fine-particle silicates.

The expandable polystyrene particles may be prepared not only by the suspension polymerization of claim 1 but also, as in claim 7, by mixing styrene polymer melt and blowing agent with expanded graphite whose average particle size is from 20 to 100 μm, and also, where appropriate, with the phosphorus compound, extruding, cooling, and pelletizing.

Subsequent impregnation of styrene polymer pellets comprising expanded graphite is also possible.

The expandable polystyrene particles may be processed to give polystyrene foams with densities of from 5 to 100 g/l, preferably from 10 to 50 g/l. For this, the expandable particles are prefoamed. This mostly takes place by heating the particles with steam in what are known as prefoamers. The resultant prefoamed particles are then fused to give moldings.

For this, the prefoamed particles are introduced into non-gas-tight molds, and the particles are brought into contact with steam. The moldings may be removed after cooling.

EXAMPLE 1

61.0 g of dicumyl peroxide and 20.2 g of dibenzoyl peroxide are dissolved in 18.0 kg of styrene, and 900 g of dimethyl phenylphosphonate are added (5% by weight, based on styrene). The organic phase is introduced into 20.2 l of demineralized water in a 50 l mixing vessel. The aqueous phase comprises 35.0 g of sodium pyrophosphate and 70.0 g of magnesium sulfate (Epsom salt). The suspension is heated rapidly to 90° C. and then, within a period of 4 hours to 130° C. 1 hour after 90° C. has been reached, 1.8 g of emulsifier K 30 (Bayer AG) are metered in. After a further hour, 2.7 kg of expanded graphite (UCAR, Grafguard 160-80, average particle size 100 $\mu$m), suspended in 2.0 kg of styrene, are added to the reaction mixture. After a further 30 minutes, 1.6 kg of pentane are metered in. Finally, completion of polymerization takes place at the final temperature of 130° C. The resultant polystyrene beads comprising blowing agent are isolated by decanting, washed, and dried to remove internal water. They are foamed by conventional processes to give foam beads and then sintered to give foam blocks or moldings.

The resultant foam blocks or moldings fulfill the requirements of fire classifications B 1 and B 2.

EXAMPLE 2

3.6 kg of polystyrene (VPT, BASF Aktiengesellschaft), 61.0 g of dicumyl peroxide and 20.2 g of tert-butylperoxy 2-ethylhexanoate are dissolved in 14.4 kg of styrene, and 900 g of dimethyl phenylphosphonate are added (5% by weight, based on styrene and polystyrene). 2.7 kg of an expanded graphite with an average particle size of 45 $\mu$m are then suspended, with stirring. The organic phase is introduced into 20.2 l of demineralized water in a 50 l mixing vessel. The aqueous phase comprises 35.0 g of sodium pyrophosphate and 70.0 g of magnesium sulfate (Epsom salt). The suspension is heated rapidly to 90° C. and then, within a period of 4 hours to 130° C. 60 minutes after 90° C. has been reached, 1.8 g of emulsifier K 30 (Bayer AG) are metered in. After a further 90 minutes, 1.6 kg of pentane are metered in. Finally, completion of polymerization takes place at the final temperature of 130° C. The resultant polystyrene beads comprising blowing agent are isolated by decanting, washed, and dried to remove internal water. They are foamed by conventional processes to give foam beads and then sintered to give foam blocks or moldings.

The resultant foam blocks or moldings fulfill the requirements of fire classifications B 1 and B 2.

EXAMPLE 3

A mixture made from polystyrene, and also 15% by weight of expanded graphite (average particle size 45 $\mu$m) and 5% by weight of red phosphorus was continuously introduced into an extruder with an internal screw diameter of 53 mm, and melted. 6% by weight of pentane is injected continuously into the extruder as blowing agent, via an inlet appature in the extruder, and is incorporated into the melt. The melt was pelletized to give bead-shaped particles, via an underwater pelletizer attached to the die plate of the extruder and operating under pressure.

Foam beads of bulk density 15 g/l were obtained by foaming twice, using steam. These foam beads, and a foam molding produced therefrom, met the requirements of fire classifications B 1 and B 2 to DIN 4102.

We claim:

1. A process for preparing particulate expandable styrene polymer bead-shaped particles by polymerizing styrene, optionally together with at least one comonomer, in aqueous suspension, which comprises carrying out the polymerization in the presence of from 5 to 50% by weight, based on the monomers, of expanded graphite, and at least one aliphatic hydrocarbon blowing agent having 4 to 6 carbon atoms is added prior to, during, or after the polymerization, thereby providing expandable styrene bead-shaped particles having an average diameter of 0.2–2.0 mm.

2. A process as claimed in claim 1, wherein from 2 to 20% by weight, based on the monomers, of a phosphorus compound are also present during the polymerization.

3. A process as claimed in claim 2, wherein the phosphorus compound is red phosphorus, or an organic or inorganic phosphate, phosphite or phosphonate.

4. A process as claimed in claim 2, wherein the phosphorus compound is triphenyl phosphate, diphenyl cresyl phosphate, ammonium polyphosphate, melamine phosphate, dimethyl phenylphosphonate, or diphenyl phosphate.

5. A process as claimed in claim 1, wherein the expanded graphite has a density of from 1.5 to 2.1 g/cm$^3$ and an average particle size (longest diameter) of from 20 to 2000 $\mu$m.

6. A process as claimed in claim 5, wherein the average particle size is from 20 to 100 $\mu$m.

7. A particulate, expandable styrene polymer bead-shaped particle which comprises a styrene polymer comprising a polymer of styrene and optionally at least one comonomer, from 5 to 50% by weight, based on the styrene polymer, of expanded graphite as uniformly distributed flame retardant, and at least one aliphatic hydrocarbon blowing agent having 4 to 6 carbon atoms, wherein the expanded graphite has an average particle size of from 20 to 100 $\mu$m, and the styrene polymer bead-shaped particles have an average diameter of 0.2–2.0 mm.

8. A method of using the expandable polystyrene particles prepared by the process of claim 1, comprising heating the expandable polystyrene particles with steam to provide a prefoamer, then fusing said prefoamer to provide molded polystyrene foams fulfilling the requirements of fire classifications B 1 and B 2.

9. The process of claim 1, wherein said comonomers are at least one selected from the group consisting of ethylenically unsaturated monomers, alkylstyrenes, divinylbenzene, acrylonitrile, and $\alpha$-methylstyrene.

10. The process of claim 1, said comonomer is present in an amount of up to 20%, based on the weight of styrene.

11. The process of claim 1, further comprising carrying out said polymerization of styrene and at least one optional comonomer in the presence of expanded graphite and at least one auxiliary.

12. The process of claim 11, wherein said at least one auxiliary is selected from the group consisting of peroxide initiators, suspensions stabilizers, blowing agents, chain transfer agents, expansion auxiliaries, nucleating agents, and plasticizers.

14. The particulate, expandable styrene polymer of claim 7, wherein the particles of expandable styrene polymer are coated with a coating agent selected from the group consisting of metal stearates, glycerol esters, and fine-particle silicates.

13. The particulate, expandable styrene polymer of claim 7, wherein the particles of expandable styrene polymer have an average diameter of 0.2–2 mm.

* * * * *